US009136945B2

(12) United States Patent
Lee et al.

(10) Patent No.: US 9,136,945 B2
(45) Date of Patent: Sep. 15, 2015

(54) VEHICLE COMMUNICATION SYSTEM FOR VISIBLE LIGHT COMMUNICATION AND OPTICAL NETWORKING AND COMMUNICATION METHOD THEREOF

(71) Applicant: KOREA ELECTRONICS TECHNOLOGY INSTITUTE, Seongnam-si, Gyeonggi-do (KR)

(72) Inventors: Sang Yub Lee, Yongin-si (KR); Sang Hyun Park, Seongnam-si (KR); Hyo Sub Choi, Jeollabuk-do (KR); Chul Dong Lee, Seongnam-si (KR)

(73) Assignee: KOREA ELECTRONICS TECHNOLOGY INSTITUTE, Seongnam-Si, Gyeonggi-Do (KR)

( * ) Notice: Subject to any disclaimer, the term of this patent is extended or adjusted under 35 U.S.C. 154(b) by 105 days.

(21) Appl. No.: 14/015,285

(22) Filed: Aug. 30, 2013

(65) Prior Publication Data
US 2014/0064740 A1    Mar. 6, 2014

(30) Foreign Application Priority Data
Sep. 6, 2012    (KR) .......................... 10-2012-0098709

(51) Int. Cl.
*H04B 10/00*    (2013.01)
*H04B 10/116*    (2013.01)
(52) U.S. Cl.
CPC .................................... *H04B 10/116* (2013.01)
(58) Field of Classification Search
USPC ......................................................... 398/172
See application file for complete search history.

(56) References Cited

U.S. PATENT DOCUMENTS

| 8,179,787 | B2 * | 5/2012 | Knapp .......................... 370/222 |
| 8,188,878 | B2 * | 5/2012 | Pederson et al. ......... 340/815.45 |
| 8,214,150 | B2 * | 7/2012 | Kohno et al. ................. 701/538 |
| 8,938,172 | B2 * | 1/2015 | Jeong et al. .................... 398/172 |
| 2002/0197955 | A1 * | 12/2002 | Witkowski et al. ............. 455/41 |
| 2004/0034455 | A1 * | 2/2004 | Simonds et al. .................. 701/1 |
| 2005/0266879 | A1 * | 12/2005 | Spaur et al. ................ 455/556.2 |
| 2007/0203641 | A1 * | 8/2007 | Diaz et al. ..................... 701/208 |
| 2007/0242834 | A1 * | 10/2007 | Coutinho et al. ............ 381/71.8 |
| 2008/0133084 | A1 * | 6/2008 | Weinmann et al. ............. 701/36 |
| 2008/0215240 | A1 * | 9/2008 | Howard et al. ............... 701/213 |
| 2008/0318518 | A1 * | 12/2008 | Coutinho et al. ............ 455/3.06 |
| 2009/0130884 | A1 * | 5/2009 | Howard et al. ............... 439/297 |
| 2009/0196609 | A1 * | 8/2009 | Koyama et al. ................. 398/58 |
| 2010/0039494 | A1 * | 2/2010 | Horihata et al. ........... 348/14.02 |

(Continued)

FOREIGN PATENT DOCUMENTS

JP      2008128669 A    6/2008
KR      200373559       1/2005

OTHER PUBLICATIONS

Korean Office Action No. 1020120098709 mailed on Sep. 5, 2013.

*Primary Examiner* — Agustin Bello
(74) *Attorney, Agent, or Firm* — Lowe Hauptman & Ham, LLP

(57)    ABSTRACT

Provided herein is a communication system and method capable of performing visible light communication and optic networking, the system performing visible light communication with an electronic device inside a vehicle and accessing an optic network inside the vehicle. Accordingly, RF interference and distortion is removed, and thus not effecting use of a wireless device inside the vehicle, thereby reducing malfunction/error of a electronic control device and enabling real time data transceiving in the vehicle.

10 Claims, 6 Drawing Sheets

(56) References Cited

U.S. PATENT DOCUMENTS

| | | | |
|---|---|---|---|
| 2010/0097817 A1* | 4/2010 | Nagara et al. | 362/464 |
| 2010/0191418 A1* | 7/2010 | Mimeault et al. | 701/36 |
| 2012/0065815 A1* | 3/2012 | Hess | 701/2 |
| 2013/0330082 A1* | 12/2013 | Perez De Aranda Alonso et al. | 398/98 |
| 2014/0064740 A1* | 3/2014 | Lee et al. | 398/130 |

* cited by examiner

VEHICLE COMMUNICATION SYSTEM FOR VISIBLE LIGHT COMMUNICATION AND OPTICAL NETWORKING AND COMMUNICATION METHOD THEREOF

CROSS-REFERENCE TO RELATED APPLICATIONS

This application claims the benefit of priority under 35 U.S.C. §119(a) of Korean Patent Application No. 10-2012-0098709, filed on Sep. 6, 2012, in the Korean Intellectual Property Office, the entire disclosure of which is incorporated herein by reference for all purposes.

BACKGROUND

1. Field

The following description relates to a vehicle communication system and method, and more particularly, to a vehicle communication system and method for communicating with a device/network inside the vehicle.

2. Description of Related Art

In the past, inside a vehicle, data used to be transmitted and received via wires, but when wired communication systems are applied to numerous services, there occurs a problem of increased wires and increased weight of the vehicle.

The RF system was introduced to resolve this problem. However, during data transmission using an RF transceiving system inside a vehicle, there are problems that RF signals may be deteriorated by shielding environments inside the vehicle, and interference and distortion of RF signals may occur due to increased wireless devices using limited frequency bandwidths inside the vehicle.

In addition, an emerging problem is that as the number of electronic control components inside a vehicle increases, there emerges an effect by the signal interference of wireless devices applied inside the vehicle.

Not only that, most of the conventional RF transceiving systems are configured to be centered around packet transmitting, thereby causing problems in data transmitting. Currently, there is a need for obtaining real time images inside vehicles, real time monitoring related to vehicles, and real time image transmitting according to vehicle accidents.

SUMMARY

The present invention was devised to resolve the aforementioned problems, and the purpose of the present invention is to provide real time images without any RF interference or distortion by providing a vehicle communication system and method for performing visible light communication with electronic devices inside vehicles, and accessing light network inside vehicles.

In one general aspect, there is provided a vehicle communication system comprising: a first communicator configured to perform visible light communication with an electronic device inside the vehicle; a second communicator configured to access an optic network inside the vehicle; and a processor configured to process data received from the electronic device through the first communicator, and to process data received from the optic network through the second communicator.

In addition, the processor may transmit the data received from the electronic device through the first communicator to the optic network through the second communicator, and transmit the data received from the optic network through the second communicator to the electronic device through the first communicator.

Furthermore, a frame used in the visible light communication may have a same structure as a frame used in the optic network.

In addition, the second communicator may be used for accessing the optic network inside the vehicle when an optic cable is connected, and may be used for performing visible light communication with the electronic device inside the vehicle, when light source is exposed outside.

In one general aspect, there is provided a vehicle communication system further comprising a display configured to display an image received from the electronic device through the first communicator or an image received from the optic network through the second communicator.

In another general aspect, there is provided a vehicle communication method comprising: performing visible light communication with an electronic device inside a vehicle; accessing an optic network inside the vehicle; and processing data received from the electronic device through visible light communication, and processing the data received from the optic network through optic communication.

As explained above, according to the present disclosure, it is possible to perform visible light communication with an electronic device inside a vehicle, and access an optic network inside the vehicle. Accordingly, RF interference and distortion is removed, and thus not effecting use of a wireless device inside the vehicle, thereby reducing malfunction/error of an electronic control device.

In addition, it is possible to perform real time data transceiving in the vehicle, enabling traffic accident management, monitoring driver's state, real time traffic situation management, and real time vehicle state management etc.

Not only that, it is possible to use in common the light source used in accessing an optic network and visible light communication inside the vehicle, thereby making the vehicle lighter due to reduced optic component elements.

Figure 1:
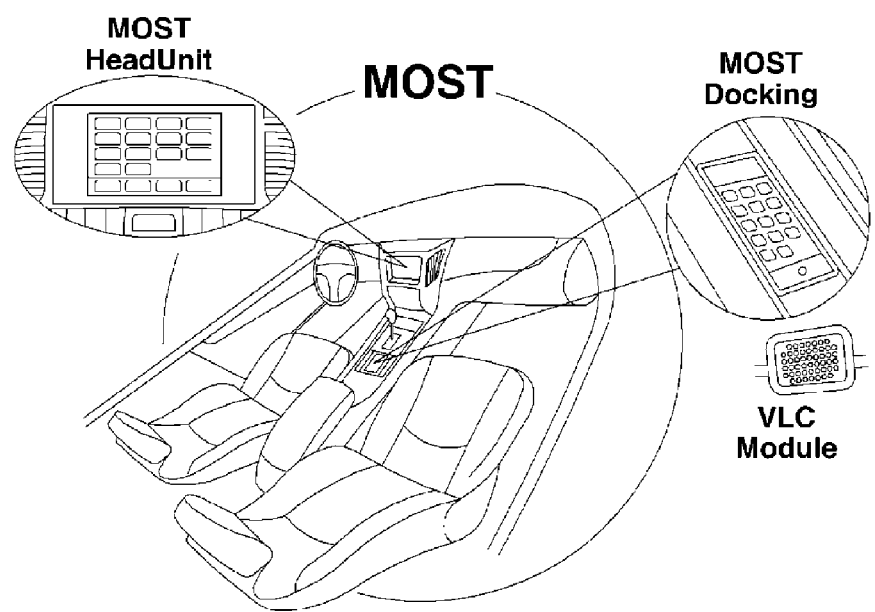
FIG. 1 is a view provided for explaining the concept of a vehicle communication system capable of performing visible light communication and optical networking according to a desirable exemplary embodiment of the present disclosure.

Throughout the drawings and the detailed description, unless otherwise described, the same drawing reference numerals will be understood to refer to the same elements, features, and structures. The relative size and depiction of these elements may be exaggerated for clarity, illustrating, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the systems, apparatuses and/or methods described herein will be suggested to those of ordinary skill in the art. Also, descriptions of well-known functions and constructions may be omitted for increased clarity and conciseness.

FIG. 1 is a view provided for explaining the concept of a vehicle communication system capable of performing visible light communication and light networking according to a desirable exemplary embodiment of the present disclosure. As illustrated in FIG. 1, a vehicle communication system according to the present exemplary embodiment performs optical communication based MOST (Media Oriented Systems Transport) networking.

In addition, a vehicle communication system according to the present exemplary embodiment may interlock an electronic device mounted on a docking unit to a MOST network. Not only that, a vehicle communication system according to the present exemplary embodiment may perform visible light communication with electronic devices inside a vehicle using a VLC (Visible Light Communication) module.

In a vehicle communication system according to the present exemplary embodiment, optical communication is adopted as means for substituting RF communication in order to remove RF interference and distortion and to guarantee real time transmission of data.

Furthermore, in the present exemplary embodiment, it is possible to embody a frame standard used in visible light communication and a frame standard used in MOST networking and present interoperability between the two, thereby enabling high volume, high resolution multimedia data processing/storing in the entirety of the vehicle.

Figure 2:
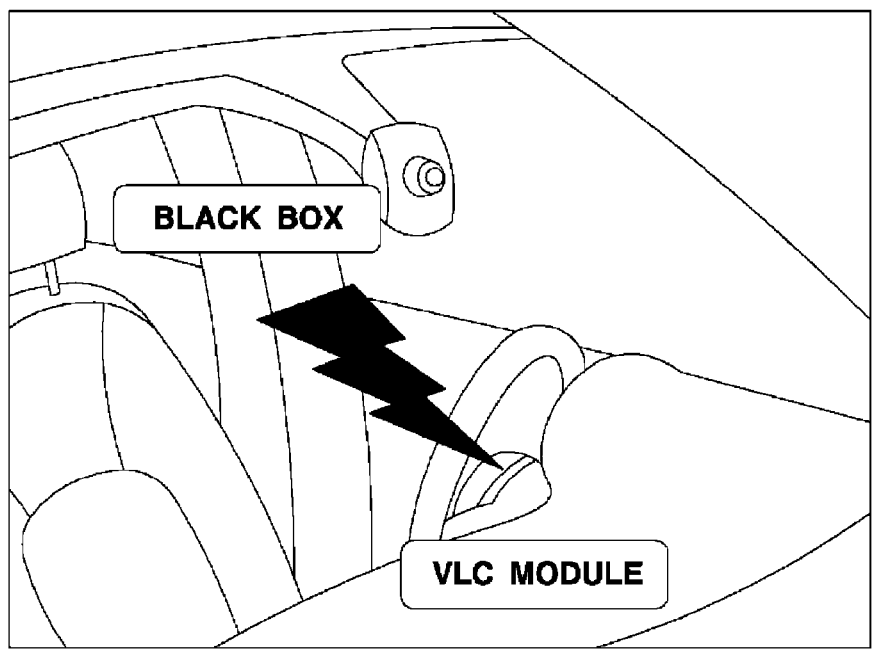
FIG. 2 is a view illustrating an example applied to a visible light communication inside a vehicle.

FIG. 2 is a view illustrating an example applied to a visible light communication inside a vehicle. FIG. 2 illustrates a situation where multimedia data created by a vehicle black box is transmitted to a VLC module using visual light communication.

By the visible light communication between a black box and VLC module illustrated in FIG. 2, multimedia data created in the black box camera may not only be received/stored in another storage medium other than the black box in real time but may be applied to vehicle accident management, in-vehicle driver management, and outside traffic situation management etc.

Not only that, by interlocking with a MOST network, together with the state of the vehicle, black box images may be obtained, stored, and processed. The MOST network has, at its end, devices for electronic control inside the vehicle such as CAN, LIN, and FlexRay etc.

This may be utilized as verification information when a vehicle accident occurs, and enables subsequent checking on a driver's driving habit, and driver's condition.

Figure 3:
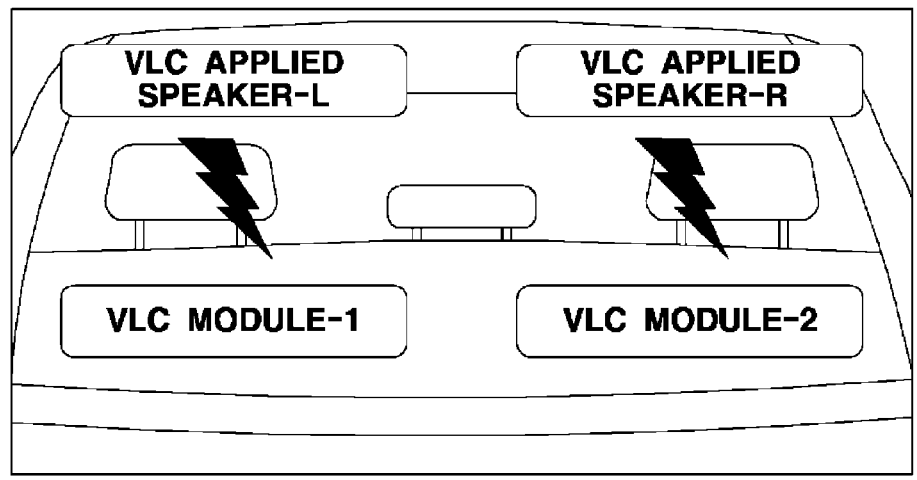
FIG. 3 is a view illustrating another example applied to a visible light communication inside a vehicle.

FIG. 3 is a view illustrating another exemplary embodiment applied to a visible light communication inside a vehicle. FIG. 3 illustrates a situation where sound is output in real time by visible light communication to vehicle speakers to which a VLC is applied in two VLC modules provided in the vehicle.

Figure 4:
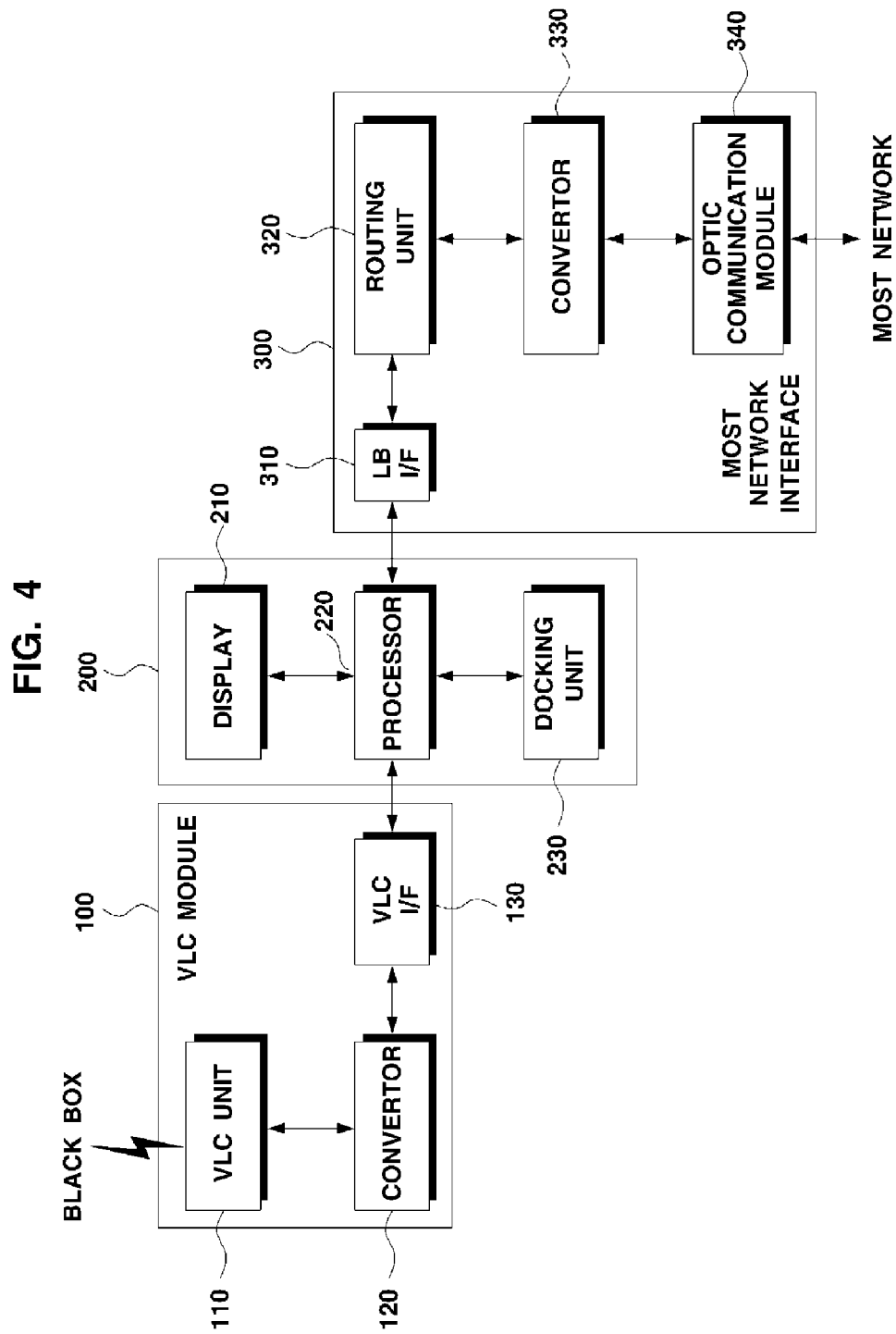
FIG. 4 is a detailed block diagram of a vehicle communication system according to the present exemplary embodiment.

FIG. 4 is a detailed block diagram of a vehicle communication system according to the present exemplary embodiment. As illustrated in FIG. 4, the vehicle communication system according to the present exemplary embodiment includes a VLC module 100, head unit 200, and MOST network interface 300.

The VLC module 100 is a module configured to perform visible light communication with an electronic device inside a vehicle, and has a VLC unit 110, convertor 120, and VLC I/F 130.

The VLC unit 110 transmits and receives data to and from a black box (or an electronic device inside a vehicle such as a speaker etc.) by visible light communication.

The convertor 120 converts a visible light signal received from the VLC unit 110 into an electrical signal, and converts the electrical signal received from the head unit 220 through the VLC I/F 130 to the VLC unit 110.

The VLC I/F 130 provides communication interface between the VLC module 100 and head unit 200.

The MOST network interface 300 is communication interface means for accessing the MOST network inside the vehicle, and includes an LB I/F (Local Bus Interface) 310, routing 320, convertor 330, and optical communication module 340.

The LB I/F 310 provides communication interface between the MOST network interface 300 and head unit 200. The routing 320 is means for routing data transmitted by the head unit 200 to a target on the MOST network.

The optical communication module 340 accesses the MOST network, and transmits and receives data based on optic communication. The convertor 330 converts an optic signal received from the optic communication module 340 into an electrical signal and transmits the electrical signal to the routing 320, and converts the electrical signal received from the routing unit 320 into an optical signal and transmits the optical signal to the optic communication module 340.

The head unit 200 processes the multimedia data received from the electronic device (for example, black box) through the VLC module 100 or transmits in real time the multimedia data to the electronic device (for example, speaker) through the VLC module 100.

In addition, the head unit 200 may process the multimedia data provided through the MOST network interface 300, or transmit in real time the multimedia data to the MOST network through the MOST network interface 300.

The head unit 200 performing these functions has a display 210, processor 220, and docking unit 230.

The display 210 is means where multimedia is reproduced, and the processor 220 may reproduce the multimedia data transmitted from the black box through the VLC module 100 or the multimedia data transmitted from the MOST network through the MOST network interface 300 on the display 210.

In addition, the processor 220 performs multimedia data relay. More specifically, the processor 220 1) may process the multimedia data received from the electronic device such as a black box through the VLC module 100 and transmit in real time the processed multimedia data to the MOST network through the MOST network interface 300, 2) process the multimedia data received from the MOST network through the MOST network interface 300 and transmit in real time the processed multimedia data to a speaker etc.

Not only that, the processor 220 may receive the multimedia data from the electronic device connected to the docking unit 230 and transmit the received multimedia data to the MOST network or speaker through the MOST network interface 300 or VLC module 100.

On the contrary, the processor 220 may transmit in real time the multimedia data received from the MOST network or black box through the MOST network interface 300 or VLC module 100 and reproduce or store the received multimedia data.

Meanwhile, the wavelength of light used in visible light communication and the wavelength of light used in MOST network are embodied in the same manner. In addition, the frame used in visible light communication and the frame used in the MOST network are embodied in the same structure. Then, the light source and optic interface of the light communication module 340 becomes usable in not only the MOST networking but also in visible light communication.

Figure 5:
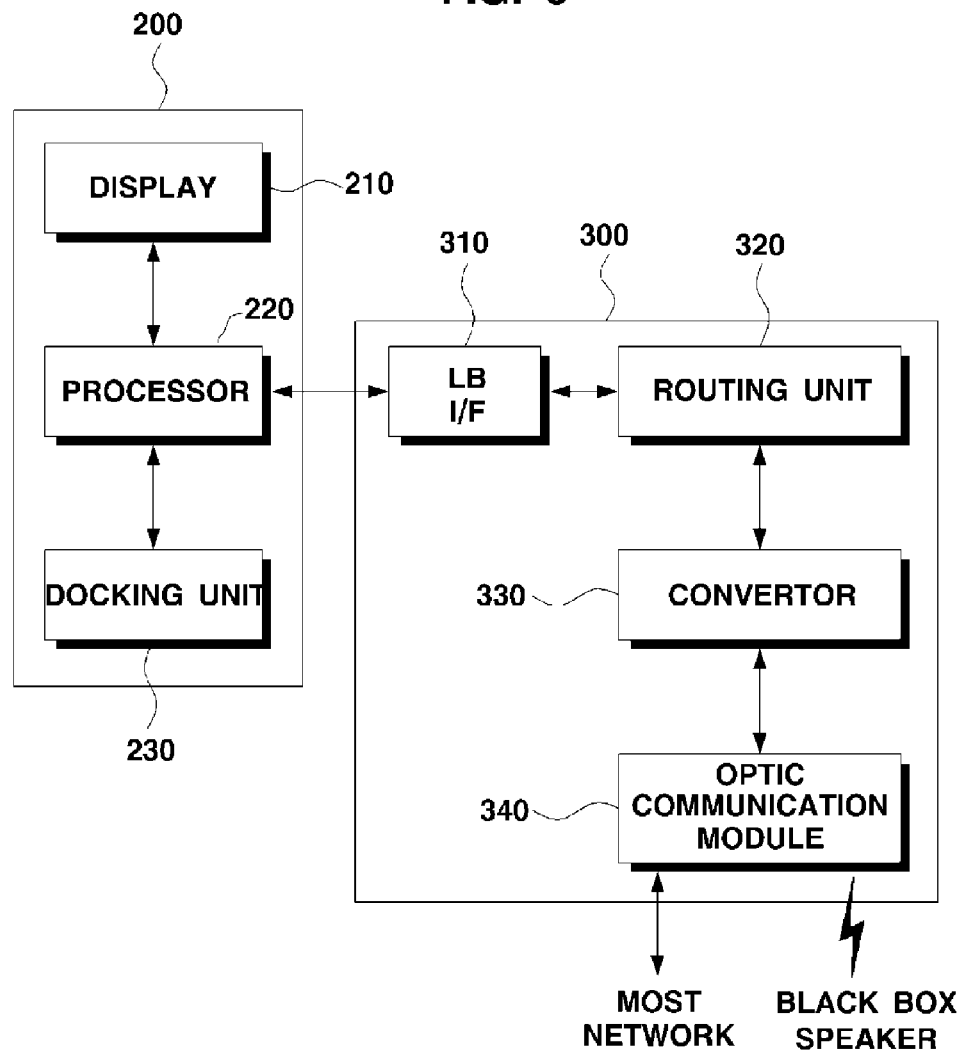
FIG. 5 is a detailed block diagram of a vehicle communication system where MOST networking and visible light communication are embodied in a common module.

Accordingly, as illustrated in FIG. 5, the MOST network interface 300 may be selectively used for accessing the MOST network and for performing visible light communication. In the former case, it is possible to connect an optical cable to the MOST network interface 300 and use the same, and in the latter case, it is possible to expose the light source of the MOST network interface 300 to outside and use the same.

Figure 6:
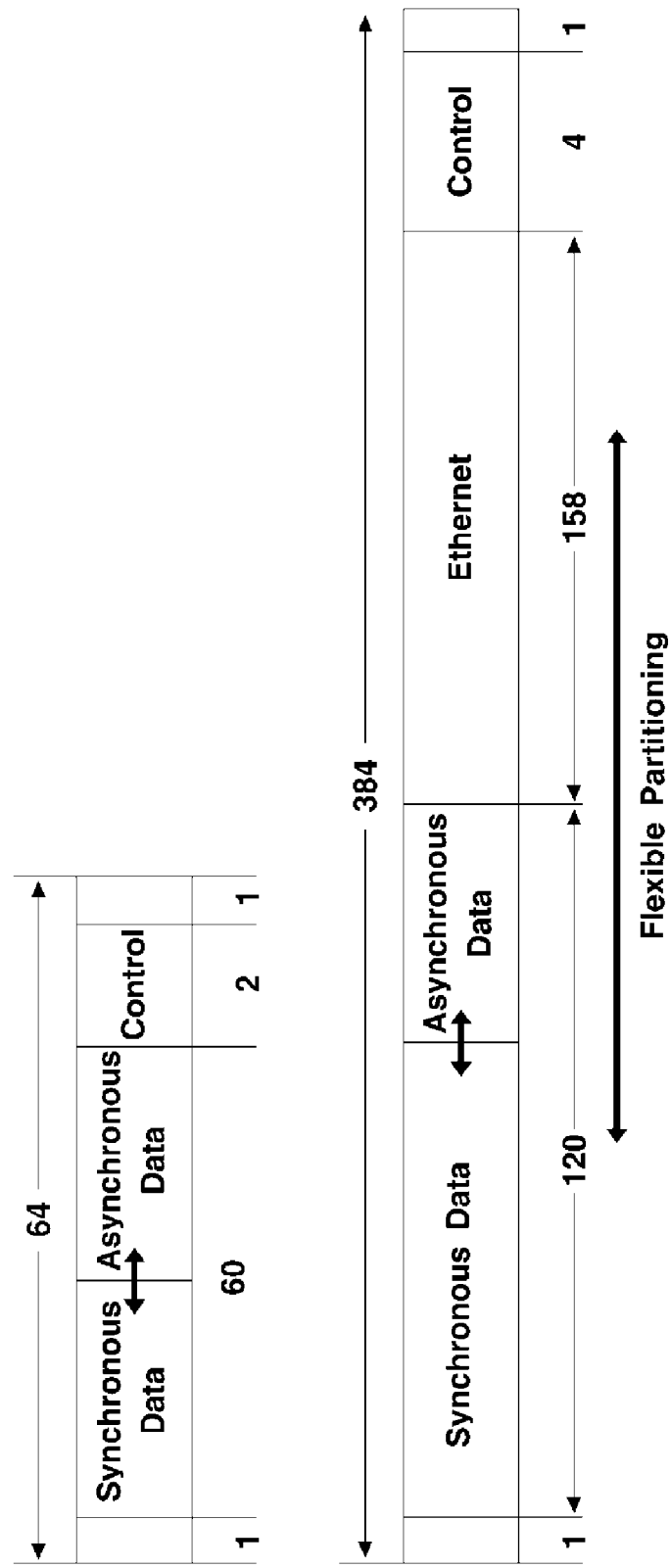
FIG. 6 is a view illustrating an example of a frame structure that may be used in both optical communication and MOST networking.

FIG. 6 is a view illustrating an example of a frame structure that may be used in both optic communication and MOST networking. The most of the frame illustrated in FIG. 6 is allocated in transmitting multimedia data in MOST networking and visible light communication, an Ethernet frame is added behind the data filed consisting of sync data and non-sync data, and their sizes are made to be adjustable elastically, thereby guaranteeing real timeness.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A vehicle communication system, comprising:
   a first communicator configured to
      communicate with a black box camera inside the vehicle, via a visible light communication,
      convert a visible light signal received from the black box camera into a first electrical signal, and
      interface with a processor;
   a second communicator configured to
      access an optic network inside the vehicle, via an optic communication,
      convert an optical signal received from the optic network into a second electrical signal, and
      interface with the processor; and
   the processor configured to
      process black box camera data by using the first electrical signal received through the first communicator,
      transmit in real time the processed black box camera data to the optic network through the second communicator, and
      process optic data by using the second electrical signal received through the second communicator,
   wherein a data frame of the visible light communication has the same structure as a data frame of the optic network, and
   wherein the second communicator is configured to
      access the optic network inside the vehicle when an optic cable is connected, and
      perform visible light communication, via the processor, with the black box camera inside the vehicle, when a light source configured to communicate with the second communicator via the optical communication is exposed outside.

2. The vehicle communication system according to claim 1, further comprising:
   a display configured to display an image received from the black box camera through the first communicator or an image received from the optic network through the second communicator.

3. A vehicle communication method, comprising:
   communicating with an black box camera inside a vehicle, via a visible light communication, when a light source communicates with a second communicator of the vehicle via an optical communication is exposed outside the second communicator,
   converting a visible light signal received from the black box camera into a first electrical signal;
   accessing an optic network inside the vehicle, via the optic communication, when an optic cable is connected with the second communicator of the vehicle;
   converting an optical signal received from the optic network into a second electrical signal;
   processing black box camera data by using the first electrical signal;
   transmitting in real time the processed black box camera data to the optic network; and
   processing optic data by using the second electrical signal,
   wherein a data frame of the visible light communication has the same structure as a data frame of the optic network.

4. The vehicle communication system according to claim 1,
   wherein the first communicator is further configured to
      communicate with a plurality of speakers inside the vehicle, via the visible light communication, and
      convert the visible light signal received from the black box camera or a visible light signal received from the plurality of speakers into the first electrical signal, and
   wherein the processor is further configured to transmit in real time the processed optic data to the plurality of speakers through the first communicator.

5. The vehicle communication method according to claim 3, further comprising:
   communicating with a plurality of speakers inside the vehicle, via the visible light communication;
   converting the visible light signal received from the black box camera or a visible light signal received from the plurality of speakers into the first electrical signal; and
   transmitting in real time the processed optic data to the plurality of speakers.

6. The vehicle communication system according to claim 1, wherein the black box camera is attached to behind of a back mirror of the vehicle.

7. The vehicle communication method according to claim 3, wherein the black box camera is attached to behind of a back mirror of the vehicle.

8. The vehicle communication system according to claim 1, wherein the visible light signal and the optical signal has the same wavelength.

9. The vehicle communication method according to claim 3, wherein the visible light signal and the optical signal has the same wavelength.

10. A vehicle communication system, comprising:
   a first communicator configured to
      communicate with a black box camera inside the vehicle, via a visible light communication,
      communicate with a plurality of speakers inside the vehicle, via the visible light communication, and
      convert a visible light signal received from the black box camera and a visible light signal received from the plurality of speakers into a first electrical signal, and
      interface with a processor;
   a second communicator configured to
      access an optic network inside the vehicle, via an optic communication, convert an optical signal received from the optic network into a second electrical signal, and interface with the processor;

the processor configured to process black box camera data by using the first electrical signal received through the first communicator, transmit in real time the processed black box camera data to the optic network through the second communicator, process optic data by using the second electrical signal received through the second communicator, and transmit in real time the processed optic data to the plurality of speakers through the first communicator; and a display configured to display an image received from the black box camera through the first communicator or an image received from the optic network through the second communicator, wherein a data frame of the visible light communication has the same structure as a data frame of the optic network, wherein the visible light signal and the optical signal has the same wavelength, wherein the black box camera is attached to behind of a back mirror of the vehicle, and wherein the second communicator is further configured to access the optic network inside the vehicle when an optic cable is connected, and perform visible light communication, via the processor, with the black box camera inside the vehicle, when a light source configured to communicate with the second communicator via the optical communication is exposed outside.

* * * * *